United States Patent [19]

Oowaki

[11] Patent Number: 6,022,837

[45] Date of Patent: Feb. 8, 2000

[54] METHOD FOR RINSING A POLISHED MEMORY HARD DISK

[75] Inventor: Toshiki Oowaki, Nishikasugai-gun, Japan

[73] Assignee: Fujimi Incorporated, Aichi, Japan

[21] Appl. No.: 08/972,142

[22] Filed: Nov. 17, 1997

[30] Foreign Application Priority Data

Nov. 26, 1996 [JP] Japan ................................. 8-314707

[51] Int. Cl.$^7$ .............................. C11D 3/02; C11D 7/08; C11D 7/10
[52] U.S. Cl. ................... 510/165; 510/175; 510/181; 510/186; 510/245; 510/253; 510/254; 134/1.1; 134/1.2; 134/1.3; 106/3
[58] Field of Search .................... 510/165, 166, 510/167, 168, 169, 170, 171, 172, 174, 175, 245, 248, 253, 254; 134/1.1, 1.2, 1.3; 106/3

[56] References Cited

U.S. PATENT DOCUMENTS

| | | | |
|---|---|---|---|
| 3,864,461 | 2/1975 | Miller et al. | 423/628 |
| 3,894,847 | 7/1975 | Asano et al. | 29/196.3 |
| 3,957,962 | 5/1976 | Ramsbotham | 423/655 |
| 4,049,575 | 9/1977 | Sasaki et al. | 252/439 |
| 4,145,316 | 3/1979 | Robson | 252/465 |
| 4,278,440 | 7/1981 | Law et al. | 23/230 |
| 4,490,483 | 12/1984 | Vogel et al. | 502/309 |
| 4,696,697 | 9/1987 | Kitano et al. | 106/3 |
| 4,767,704 | 8/1988 | Cleveland et al. | 435/68 |
| 4,769,046 | 9/1988 | Senda et al. | 51/293 |
| 4,956,015 | 9/1990 | Okajima et al. | 106/3 |
| 5,002,919 | 3/1991 | Yamazaki et al. | 502/315 |
| 5,226,955 | 7/1993 | Owaki | 106/3 |
| 5,366,542 | 11/1994 | Yamada et al. | 106/3 |
| 5,441,630 | 8/1995 | Dai et al. | 208/216 |
| 5,565,091 | 10/1996 | Iino et al. | 208/216 |

FOREIGN PATENT DOCUMENTS

| | | |
|---|---|---|
| 0205173 | 12/1986 | European Pat. Off. . |
| 95/28937 | 11/1995 | WIPO . |
| WO 95/28937 | 11/1995 | WIPO . |

OTHER PUBLICATIONS

Derwent Abstracts, AN 96–368826/199637, JP 8 176891, Jul. 9, 1996.

Derwent Abstracts, AN 96–026568/199603, JP 7 299369, Nov. 14, 1995.

*Primary Examiner*—Yogendra Gupta
*Assistant Examiner*—Charles Boyer
*Attorney, Agent, or Firm*—Oblon, Spivak, McClelland, Maier & Neustadt, P.C.

[57] ABSTRACT

A composition for rinsing a memory hard disc, which comprises water and an additive selected from the group consisting of an oxo-acid, an oxo-acid salt and a chloride.

9 Claims, No Drawings

METHOD FOR RINSING A POLISHED MEMORY HARD DISK

The present invention relates to a rinsing composition suitable for surface finishing after polishing the surface of a memory hard disc (a substrate for magnetic disc) in the production of such a disc useful for a memory device to be used for e.g. computers. More particularly, the present invention relates to a rinsing composition which is capable for forming an excellent treated surface in the surface finishing after polishing or texturing of a memory hard disc represented by a Ni—P disc, a Ni—Fe disc, an aluminum disc, a boron carbide disc or a carbon disc, and which is useful for the production of a memory hard disc to be used for a magnetic disc device having a high capacity and a high recording density.

Memory hard discs to be used for magnetic disc devices which are one of memory media for e.g. computers, tend to be small in size and large in capacity year after year, and magnetic media are changing from conventional coating type to thin film media formed by a sputtering method, a plating method or the like.

The most commonly employed disc substrate (hereinafter referred to as a "substrate") at present is one having electroless Ni—P plating applied to an aluminum substrate. This substrate is usually polished, after the plating, by means of a polishing composition (hereinafter referred to as a "slurry" in view of its nature) comprising aluminum oxide, various other polishing materials, water and various polishing accelerators. In many cases, fine protrusions (hereinafter referred to as "microprotrusions") of a size which is usually not more than 50 $\mu$m, may form on the polished substrate surface, e.g. due to re-sticking of swarf (chips) of Ni—P plating cut off by polishing, due to formation of burr when the Ni—P surface is scratched by the polishing material, or due to deposition of abrasive grains from the slurry composition on the substrate surface, although the degree varies depending upon the type of the slurry.

Further, for the purpose of preventing sticking of the magnetic head for recording information to the memory hard disc, so-called texturing may be applied to score the substrate after polishing. Also during this texturing, microprotrusions may form e.g. due to re-sticking of swarf of Ni—P plating cut off, or due to formation of burr due to scratching by abrasive grains in the texturing composition (hereinafter referred to as a "slurry" like the polishing composition).

On the other hand, along with the trend for high capacity of the memory hard disc, the recording density is being improved at a rate of a few tens % every year. Accordingly, for a recent magnetic disc device, it is required to minimize the flying height of the head, which is a space between the magnetic head and the memory hard disc. At present, the flying height of the head is reduced to a level of at most 0.15 $\mu$m.

Further, recently, for the purpose of further reducing the flying height of the head, it has been proposed to carry out light texturing to form thinner scorelines on the substrate, or to use a non-textured substrate having no scorelines without carrying out texturing. Thus, so-called lower flying height of a magnetic head is being advanced.

Thus, the flying height of a head is required to be very low. Accordingly, if microprotrusions of a few $\mu$m are present on the surface of a memory hard disc, the head is likely to collide with the microprotrusions on the substrate surface, i.e. so-called "head crush" is likely to occur, whereby the magnetic medium on the surface of the memory hard disc or the magnetic head is likely to be damaged, which in turn leads to failure of the magnetic disc device. Further, even finer protrusions which are free from bringing about head crush, may cause an error in writing or reading out information due to turbulence of the magnetic characteristic at the protrusions. Accordingly, it is important to prevent formation of microprotrusions in the polishing and texturing steps i.e. in the preceding steps for preparation of a magnetic medium, and at the same time, it is necessary to completely remove formed microprotrusions.

To remove such microprotrusions, it is common to rinse the substrate after polishing in the process for producing a substrate. This rinsing treatment is primarily intended to clean the substrate surface after polishing by removing swarf and abrasive grains remaining on the surface.

On the other hand, if, after polishing and texturing of a substrate, the used slurry (hereinafter referred to as "the waste liquid") is dried as deposited on the substrate surface, the slurry can not be completely removed in the subsequent cleaning step and thus is likely to cause formation of microprotrusions. Further, if a substrate stained with the slurry after polishing and texturing, is introduced directly into a cleaning apparatus, the cleaning apparatus will be unduly loaded. Furthermore, the waste liquid remaining on the substrate is likely to attach to the body or clothing of the worker, or pollute the working site, thus leading to pollution of working environment. To prevent such problems, is also a purpose of the rinsing treatment of a substrate after polishing and texturing.

For the above purposes, it has heretofore been common that after texturing, the slurry is replaced by pure water or a rinsing composition containing a surfactant, and the substrate is subjected to rinsing treatment in the same apparatus in a short period of time under a low pressure. However, by the rinsing with such pure water or a rinsing composition, there have sometimes been problems such that microprotrusions are rather likely to form, formation of microprotrusions can not constantly be prevented, the surfactant used can not completely be removed by subsequent cleaning and may remain on the substrate, and surface defects other than microprotrusions, such as scratch marks or pits, are likely to form.

It is an object of the present invention to solve the above problems and to provide a rinsing composition which is capable of removing microprotrusions and makes it possible to obtain an excellent substrate surface free from surface defects other than microprotrusions, such as scratch marks or pits, as has heretofore been desired for a rinsing composition to be used for rinsing a substrate, and which, at the same time, is capable of preventing deposition of abrasive grains from the slurry, reducing the load to the cleaning apparatus and improving the working environment.

The present invention provides a composition for rinsing a memory hard disc, which comprises water and an additive selected from the group consisting of an oxo-acid, an oxo-acid salt and a chloride.

The present invention also provides the use of such a composition as an agent for rinsing a memory hard disc.

Further, the present invention provides a method for rinsing a memory hard disc, wherein such a composition is used as an agent for the rinsing.

The rinsing composition of the present invention is capable of removing microprotrusions formed during preparation of a substrate for a memory hard disc and makes it possible to obtain an excellent substrate surface free from surface defects other than the microprotrusions, such as scratch marks (scars) or pits (fine dents). Further, it is effective to prevent deposition of abrasive grains from the slurry, to reduce the load to the cleaning apparatus and to improve the working environment.

Now, the present invention will be described in detail with reference to the preferred embodiments.

Additive

The type of the oxo-acid salt or the chloride to be used for the rinsing composition of the present invention is not particularly limited so long as it does not impair the effects of the present invention. However, the oxo-acid salt is preferably selected from the group consisting of a nitrate, a molybdate, a sulfate, a perchlorate, a hypochlorite, a persulfate and a sulfite.

Such an oxo-acid salt or a chloride is preferably selected from the following compounds.

(1) Nitrates

Aluminum nitrate, nickel nitrate, ammonium nitrate, potassium nitrate, calcium nitrate, cobalt nitrate, cesium nitrate, sodium nitrate and lithium nitrate (2) Molybdates Ammonium molybdate, calcium molybdate and sodium molybdate (3) Sulfates Aluminum sulfate, ammonium sulfate, potassium sulfate, sodium sulfate, nickel sulfate and magnesium sulfate (4) Perchlorates Sodium perchlorate and potassium perchlorate (5) Hypochlorites Sodium hypochlorite and potassium hypochlorite (6) Persulfates Sodium persulfate, potassium persulfate and ammonium persulfate (7) Sulfites Sodium sulfite, potassium sulfite and ammonium sulfite (8) Chlorides Aluminum chloride, ammonium chloride, potassium chloride, calcium chloride, nickel chloride, sodium chloride and lithium chloride These compounds are shown as single salts, respectively, but they may be higher order compounds thereof, such as double salts. Further, these salts may be anhydrous or may be ones containing water of crystallization.

The oxo-acid to be used for the rinsing composition of the present invention is not particularly limited so long as it does not impair the effects of the present invention. However, it is preferably selected from the group consisting of perchloric acid, hypochlorous acid, persulfuric acid, sulfurous acid, sulfuric acid, nitric acid and molybdic acid, more preferably selected from the group consisting of perchloric acid, hypochlorous acid, persulfuric acid and sulfurous acid.

These oxo-acid salts, chlorides and oxo-acids (hereinafter generally referred to as an "additive") may be used alone or in combination as a mixture. For example, the additive may preferably be a combination of an oxo-acid and an oxo-acid salt. Particularly preferred as the additive, is aluminum nitrate, ammonium molybdate, or a combination of aluminum nitrate and ammonium molybdate.

The content of such an additive in the rinsing composition varies depending upon the intensity of the action of the additive, but is preferably from 0.001 to 50 wt %, more preferably from 0.01 to 30 wt %, based on the total amount of the rinsing composition. In general, as the amount of the additive increases, the effects of the present invention will be stronger. However, if the amount is excessive, economical disadvantage is likely to be larger than the improvement in the effects by the incorporation. The amount of water is preferably from 50 to 99.999 wt %, more preferably from 70 to 99.99 wt %, based on the total amount of the rinsing composition.

The pH of the rinsing composition of the present invention is preferably at most 7. The pH of a rinsing composition employing the above additive, is usually at most pH 7. However, if the pH changes, for example, by an addition of various auxiliary additives and becomes higher than pH 7, it is preferred to adjust the pH to a level of at most 7. In such a case, it is preferred to employ the above-mentioned oxo-acid for the adjustment.

The detailed mechanism for the removal of microprotrusions which can be accomplished by using the rinsing composition of the present invention as an agent for rinsing a substrate, is not clearly understood. However, the mechanism may be explained as follows, taking a Ni—P plated substrate as an example.

It is considered that the additive of the present invention serves to chemically change the Ni—P plated surface, so that Ni—P swarf deposited on the substrate surface by polishing, and burr formed by scratching with an abrasive material during polishing and texturing, tend to be brittle and will be removed when wiped with a polishing pad containing the rinsing composition. It is also conceivable that the chemical nature of the Ni—P plated surface changes so that Ni—P swarf and abrasive grains in the slurry tend to hardly re-stick thereon.

Rinsing Composition

The rinsing composition of the present invention is prepared usually by weighing a predetermined amount of the above additive and then mixing and dissolving it in water. A method for dissolving such an additive in water is optional and may, for example, be a method of stirring by a vane type stirrer, a method of dissolving the additive by ultrasonic dispersion, etc.

For the preparation of the rinsing composition of the present invention, various known auxiliary additives may be employed for the purpose of maintaining or stabilizing the quality of the rinsing composition or depending upon the rinsing conditions or the necessity from other process requirements.

Examples of such auxiliary additives include:

(a) Celluloses such as cellulose, carboxymethylcellulose, hydroxyethylcellulose and others, (b) Water-soluble alcohols such as ethanol, propanol, ethylene glycol and others, (c) Surfactants such as sodium alkylbenzene sulfonate, a formalin condensate of naphthalene sulfonic acid and others, (d) Organic polyanion substances such as a lignin sulfonate, a polyacrylate and others, (e) Water-soluble polymers (emulsifiers) such as polyvinyl alcohol and others, (f) Silicon dioxides such as colloidal silica, fumed silica and others, (g) Titanium oxides such as titania, fumed titania and others, (h) Zirconium oxides such as fumed zirconia and others, (i) Aluminum oxides such as alumina sol, fumed alumina and others, (j) Fungicides such as sodium arginate, potassium hydrogencarbonate and others.

For the preparation of the rinsing composition of the present invention, the method of mixing the additives and the order of mixing are not particularly limited so long as they do not impair the effects of the present invention.

Further, the rinsing composition of the present invention may be prepared in the form of a stock solution having a relatively high concentration, so that it may be stored or transported in that form, and may be diluted for use at the time of the actual rinsing operation. The above-mentioned preferred range of concentration is the one at the time of the actual rinsing operation. When the composition is prepared in the form of such a stock solution, it is, of course, a liquid having a high concentration in the state where it is stored or transported.

Now, the rinsing composition of the present invention will be described in further detail with reference to Examples. However, it should be understood that the present invention is by no means restricted to such specific Examples.

EXAMPLES 1 TO 8 AND COMPARATIVE EXAMPLES 1 AND 2

Preparation of Rinsing Compositions

The additives as identified in Table 1 were, respectively, added in an amount of 10 g to 1 l of pure water and dispersed in the predetermined amounts of water by means of a stirrer to obtain rinsing compositions used in Examples 1 to 8.

Polishing of Substrates

The substrates were polished under the following conditions. The composition used for the polishing was prepared by diluting a slurry comprising 20 wt % of aluminum oxide and 1 wt % of malic acid (based on the weight of the slurry) three times with pure water.

Polishing Conditions

| | |
|---|---|
| Works: | 3.5" Ni—P substrates |
| Number of works: | Ten discs |
| Polishing machine: | Double side polishing machine 9B type |
| Pressure: | 80 g/cm$^3$ |
| Table revolutions: | 60 rpm |
| Slurry feed rate: | 100 cc/min |
| Polishing time: | 5 minutes |

Rinsing Test

After completion of the above polishing, the conditions were immediately changed as identified below, and rinsing tests of Examples 1 to 8 were carried out.

Comparative Example 1 represents a case where no rinsing treatment was carried out, and Comparative Example 2 represents a case in which pure water was used as a rinsing agent.

Rinsing Conditions

| | |
|---|---|
| Pressure: | 40 g/cm$^3$ |
| Table revolutions: | 30 rpm |
| Rinsing composition feed rate: | 300 cc/min |
| Rinsing time: | 30 seconds |

After completion of the rinsing treatment, the substrate was sequentially washed and dried by conventional methods, and then by means of a differential interference microscope (magnification: 400 times), microprotrusions present on the substrate surface were counted per one field of view of the microscope. The microscopic observation was carried out with respect to 10 fields of view, and the average thereof was obtained and taken as microprotrusions (number/field). The obtained results are shown in Table 1.

TABLE 1

| | Additive | Microprotrusions (number/field of view) | Scratch marks | Pits |
|---|---|---|---|---|
| Example 1 | Aluminum nitrate 9H$_2$O | 2 | ○ | ○ |
| Example 2 | Ammonium nitrate | 0 | ○ | ○ |
| Example 3 | Ammonium molybdate 4H$_2$O | 0 | ○ | ○ |
| Example 4 | Sodium sulfite | 5 | ○ | ○ |
| Example 5 | Aluminum sulfate | 7 | ○ | ○ |
| Example 6 | Aluminum chloride | 10 | ○ | ○ |
| Example 7 | Sodium hypochlorite | 0 | ○ | ○ |
| Example 8 | Perchloric acid | 2 | ○ | ○ |
| Comparative Example 1 | (Polishing only i.e. no rinsing) | 100 | ○ | x |
| Comparative Example 2 | (Rinsing with pure water only) | 75 | x | ○ |

○: Not observed
x: Observed

From the results in Table 1, it is evident that the rinsing compositions of the present invention are capable of removing microprotrusions formed on the substrate surface by polishing. Further, it is evident that when the rinsing compositions of the present invention were used, no scratch marks or pits were observed.

As described in the foregoing, the rinsing composition of the present invention is capable of removing microprotrusions which are formed during preparation of substrates for memory hard discs and makes it possible to obtain an excellent substrate surface free from surface defects other than the microprotrusions, and it is effective also for preventing deposition of abrasive grains from the slurry, reducing the load to the cleaning apparatus and improving the working environment. Thus, it is possible to attain the processing quality which is required for high capacity and high recording density of memory hard discs in recent years.

What is claimed is:

1. A method of removing microprotrusions and other surface defects from a polished memory hard disc comprising rinsing said polished disc with a composition comprising water and an additive selected from the group consisting of an oxo-acid, an oxo-acid salt and a chloride.

2. The method according to claim 1 wherein the additive is selected from the group consisting of perchloric acid, hypochlorous acid, persulfuric acid, sulfurous acid, sulfuric acid, nitric acid, molybdic acid, a nitrate, a molybdate, a sulfate, a perchlorate, a hypochlorite, a persulfate, a sulfite and a chloride.

3. The method according to claim 1, wherein the additive is selected from the group consisting of aluminum nitrate, nickel nitrate, ammonium nitrate, potassium nitrate, calcium nitrate, cobalt nitrate, cesium nitrate, sodium nitrate, lithium nitrate, ammonium molybdate, calcium molybdate, sodium molybdate, aluminum sulfate, ammonium sulfate, potassium sulfate, sodium sulfate, nickel sulfate, magnesium sulfate, sodium perchlorate, potassium perchlorate, sodium hypochlorite, potassium hypochlorite, sodium persulfate, potassium persulfate, ammonium persulfate, sodium sulfite, potassium sulfite, ammonium sulfite, aluminum chloride, ammonium chloride, potassium chloride, calcium chloride, nickel chloride, sodium chloride and lithium chloride.

4. The method according to claim 1, wherein the additive is a combination of an oxo-acid and an oxo-acid salt.

5. The method according to claim 1, wherein the additive is aluminum nitrate.

6. The method according to claim 1, wherein the additive is ammonium molybdate.

7. The method according to claim 1, wherein the additive is a combination of aluminum nitrate and ammonium molybdate.

8. The method according to claim 1, wherein the additive is in an amount of from 0.001 to 50 wt %, based on the weight of the composition.

9. A method of removing microprotrusions and other surface defects from a polished memory hard disc comprising rinsing said polished disc with a solution comprising water and an additive selected from the group consisting of an oxo-acid, an oxo-acid salt and a chloride.

* * * * *